United States Patent
Yan

(10) Patent No.: US 7,357,665 B1
(45) Date of Patent: Apr. 15, 2008

(54) BATTERY CONNECTOR

(75) Inventor: Lai-Ming Yan, Tu Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/808,938

(22) Filed: Jun. 14, 2007

(51) Int. Cl.
*H01R 3/00* (2006.01)

(52) U.S. Cl. ...................... 439/500; 439/862

(58) Field of Classification Search .......... 439/83, 439/441, 660, 862, 500
See application file for complete search history.

(56) References Cited

U.S. PATENT DOCUMENTS

| | | | | |
|---|---|---|---|---|
| 5,538,435 A | * | 7/1996 | Yohn ........................... | 439/500 |
| 6,129,582 A | * | 10/2000 | Wilhite et al. ............... | 439/500 |
| 6,231,394 B1 | * | 5/2001 | Schnell et al. .............. | 439/862 |
| 6,695,628 B2 | * | 2/2004 | Yeh ............................. | 439/83 |
| 6,951,488 B2 | * | 10/2005 | Hsieh ........................... | 439/660 |
| 6,994,566 B2 | * | 2/2006 | You ............................. | 439/733.1 |
| 2002/0048999 A1 | * | 4/2002 | Ming-Hui ................... | 439/660 |

* cited by examiner

*Primary Examiner*—Briggitte R. Hammond
(74) *Attorney, Agent, or Firm*—Rosenberg, Klein & Lee

(57) ABSTRACT

A battery connector includes a dielectric housing defining terminal grooves therein to receive plenty of electric terminals. The tops of two sidewalls of each terminal groove extend inwardly to form a pair of withstanding beams. A gap is formed on the front end of the withstanding beam. The electric terminal has a base. The rear end of the base bends upwardly to form a spring portion. A contact portion extends from one end of the spring portion. The middle of the front end of the base bends upwardly to form a welded tail portion leaning inwardly. Two project edges extend outwardly from two sides of the top of the welded tail portion. The welded tail portion is located in the front end of the terminal groove with a part exposed outside the front surface. The project edges are located in the gaps and against the front walls of the withstanding beams.

3 Claims, 4 Drawing Sheets

BATTERY CONNECTOR

BACKGROUND OF THE INVENTION

1. Field of the Invention

This present invention relates to a battery connector, and more specifically to a battery connector for mounting on an electric board firmly.

2. The Related Art

In the mobile communication field, a battery connector is arranged in a mobile phone to electrically connect the battery with an electric board. A traditional battery connector 50 disclosed in FIG. 4, includes a terminal housing 60 and plenty of electric terminals 70 accepted in the terminal housing 60. Plenty of accepted grooves 61 corresponding to the electric terminals 70 are opened in the terminal housing 60. The electric terminal 70 has a welded portion 71 with a rectangular figure. The welded portions 71 are bent 90 degrees and located in the front end of the accepted grooves 61.

As the above description, while the electric terminals 70 are assembled with the terminal housing 60, the welded portion 71 is easily to sink into the accepted groove 61. Then the welded portion 71 is not parallel with the electric board, so the welded portion 71 cannot be welded with the electric board firmly.

SUMMARY OF THE INVENTION

It is therefore an object of the present invention to provide a battery connector which can solve the foregoing problem.

The batter connector comprises a dielectric housing, a first electric terminals and a pair of second electric terminals. The dielectric housing has a front surface, a rear surface, an upper surface and a lower surface. Plenty of terminal grooves are opened from the front surface to the rear surface and through the upper surface, the bottoms of the terminal grooves extend toward two sides thereof to form a fixing groove respectively, the tops of two sidewalls of each terminal groove extend inwardly to form a pair of withstanding beams, the front end of the withstanding beam is cut off to form a gap. The first electric terminals and the second electric terminal have a base respectively. The rear end of the base bends upwardly to form a spring portion. A contact portion extends from the end of the spring portion. The middle of the front end of the base bends upwardly to form a welded tail portion leaning inwardly a little. Two project edges extend outwardly from two sides of the top of the welded tail portion. The welded tail portion is located in the front end of the terminal groove with a part exposed outside the front surface. The project edges of the electric terminal are located in the gaps and against the front walls of the withstanding beams.

As the above description, when the electric terminals are assembled into the terminal grooves, the project edges of the electric terminals are against the front surface of the dielectric housing, so the welded tail portions can be welded with the electric board with maximum areas.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 1:
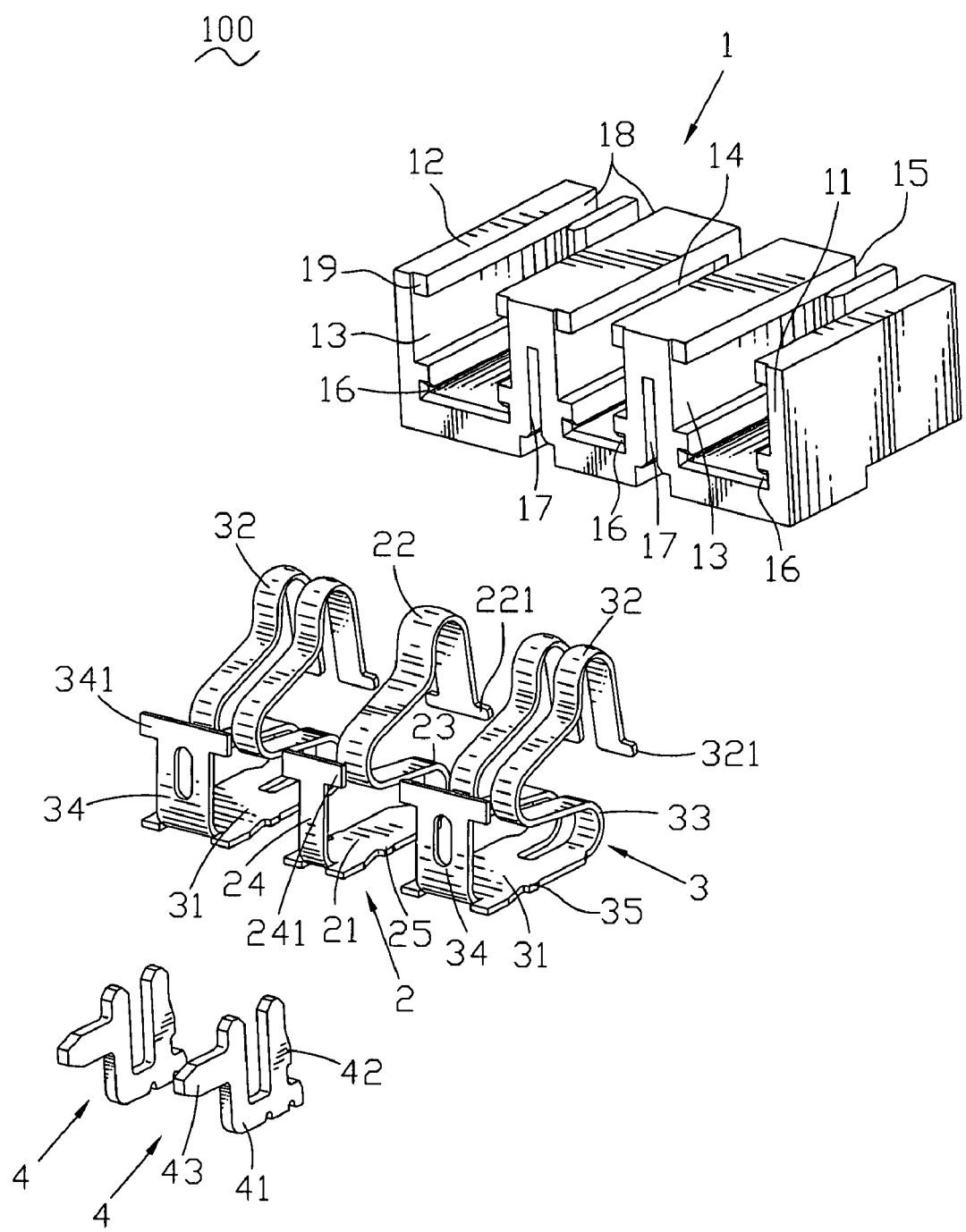
FIG. 1 is an exploded perspective view of a battery connector according to the present invention.

Please referring to FIG. 1, a battery connector 100 according to the invention is shown. The battery connector 100 comprises a dielectric housing 1, a first electric terminal 2, a pair of second electric terminals 3 and a pair of ground springs 4. The ground springs 4 are inserted into two sides of the dielectric housing 1.

The dielectric housing 1 shows a rectangle shape and has a front surface 11, a rear surface 15, an upper surface 12, and a lower surface 10, a first terminal groove 14 and a pair of second terminal grooves 13 are opened from the front surface 11 to the rear surface 15 and through the upper surface 12. The first terminal groove 14 is defined between the second terminal grooves 13. The bottoms of the first terminal groove 14 and the second terminal grooves 13 extend toward two sides thereof to form a fixing groove 16 respectively. The tops of two sidewalls of each terminal groove 13, 14 extend inwardly respectively to form a pair of withstanding beams 18. The front end of the withstanding beam 18 is cut off to form a gap 19. The front of the lower surface 10 defines a pair of receiving grooves 17 which are located at two places between the first terminal groove 14 and the second terminal grooves 13 respectively and penetrate through the front surface 11.

The first electric terminal 2 includes a first base 21, the rear end of the first base 21 bends upwardly and extends forward, and then bends upwardly and extends rearward to form a first spring portion 23, a first contact portion 22 extends upwardly then bends downwardly and rearward from the end of the first spring portion 23. Two first project slices 221 extend outwardly from two sides of the rear end of the first contact portion 22. The middle of the front end of the first base 21 bends upwardly to form a first welded tail portion 24, the first welded tail portion 24 leans rearward a little, therefore, an included angle of 85 degree is formed between the first base 21 and the first welded tail portion 24. Two project edges 241 extend outwardly from two sides of the top of the first welded tail portion 24. Two first agnails 25 are arranged in two sides of the first base 21.

The second electric terminal 3 includes a second base 31, two sides of the rear end of the second base 31 bends upwardly and extends forward, and then bends upwardly and extends rearward to form a pair of second spring portions 33 apart from each other, a second contact portion 32 extends upwardly then bends downwardly and rearward from the end of the second spring portion 33. A second project slice 321 extends outwardly from the outside of the rear end of the second contact portion 32. The middle of the front end of the second base 31 bends upwardly to form a second welded tail portion 34, the second welded tail portion 34 leans rearward a little, therefore, an included angle of 85 degree is formed between the second base 31 and the second welded tail portion 34. Two project edges 341 extend outwardly from two sides of the top of the second welded tail portion 34. Two second agnails 35 are arranged in two sides of the second base 31.

The ground springs 4 are used for fixing the battery connector 100 on an outer electric board 5 (shown in FIG. 5). The ground spring 4 has a body 41 with a U shape. The body 41 includes a bottom arm, a front arm and a rear arm extending upwardly from the front and the rear of the bottom arm respectively. A fixed pillar 43 extends forward from the front arm of the body 41 and is vertical to the front arm, and the fixed pillar 43 is inserted in the electric board 5. A cam 42 is formed at the rear arm of the body 41 to interfere with the receiving groove 17, for fixing the ground spring 4 in the receiving groove 17 firmly.

Figure 2A:
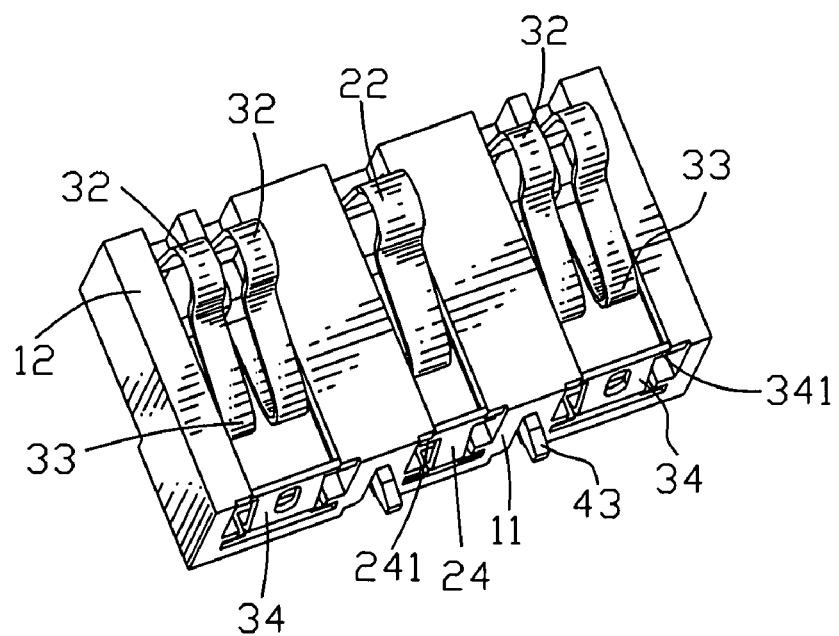
FIG. 2A is a schematic top view of the battery connector.
Figure 2B:
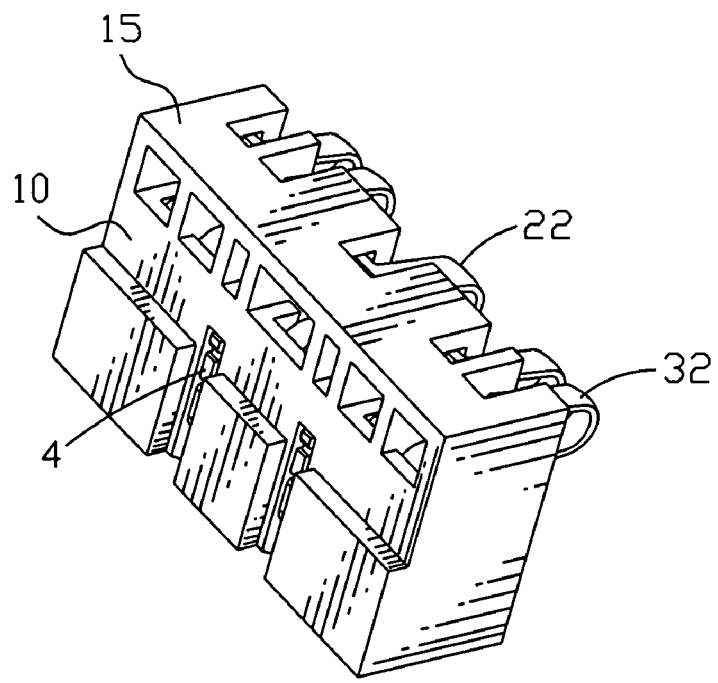
FIG. 2B is a schematic bottom view of the battery connector.
Figure 3:
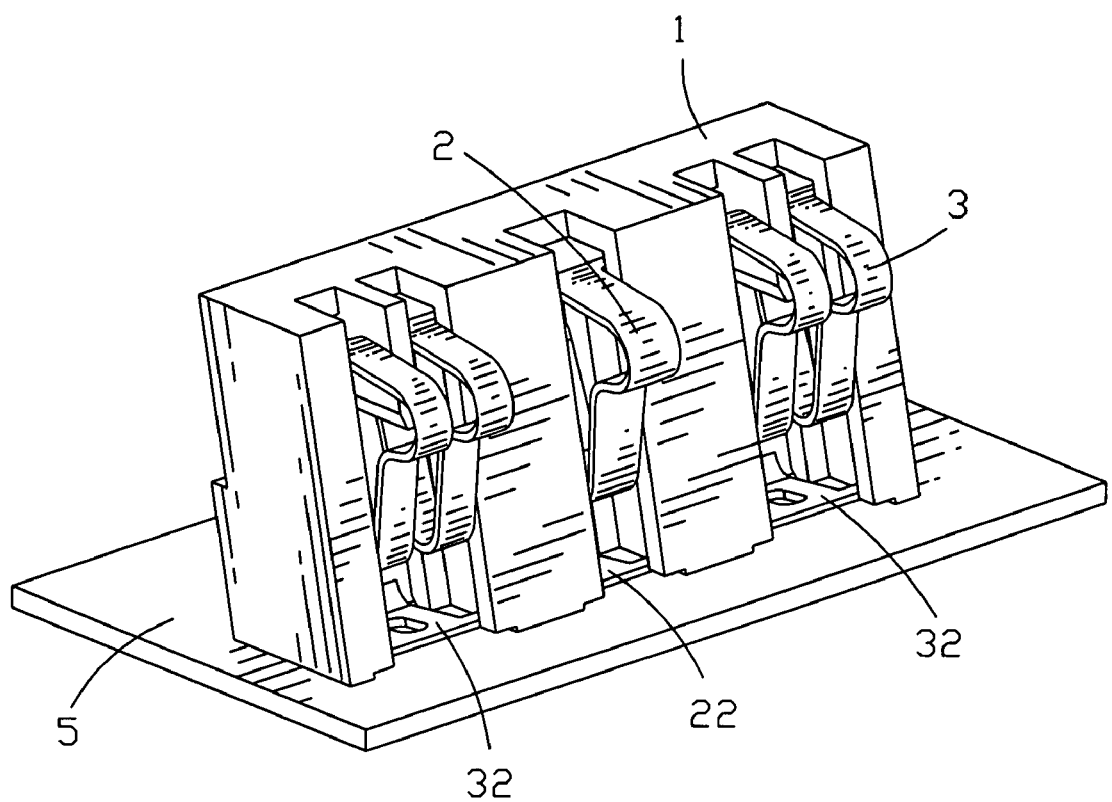
FIG. 3 is a perspective view of the battery connector, assembled on a PCB.
Figure 4:
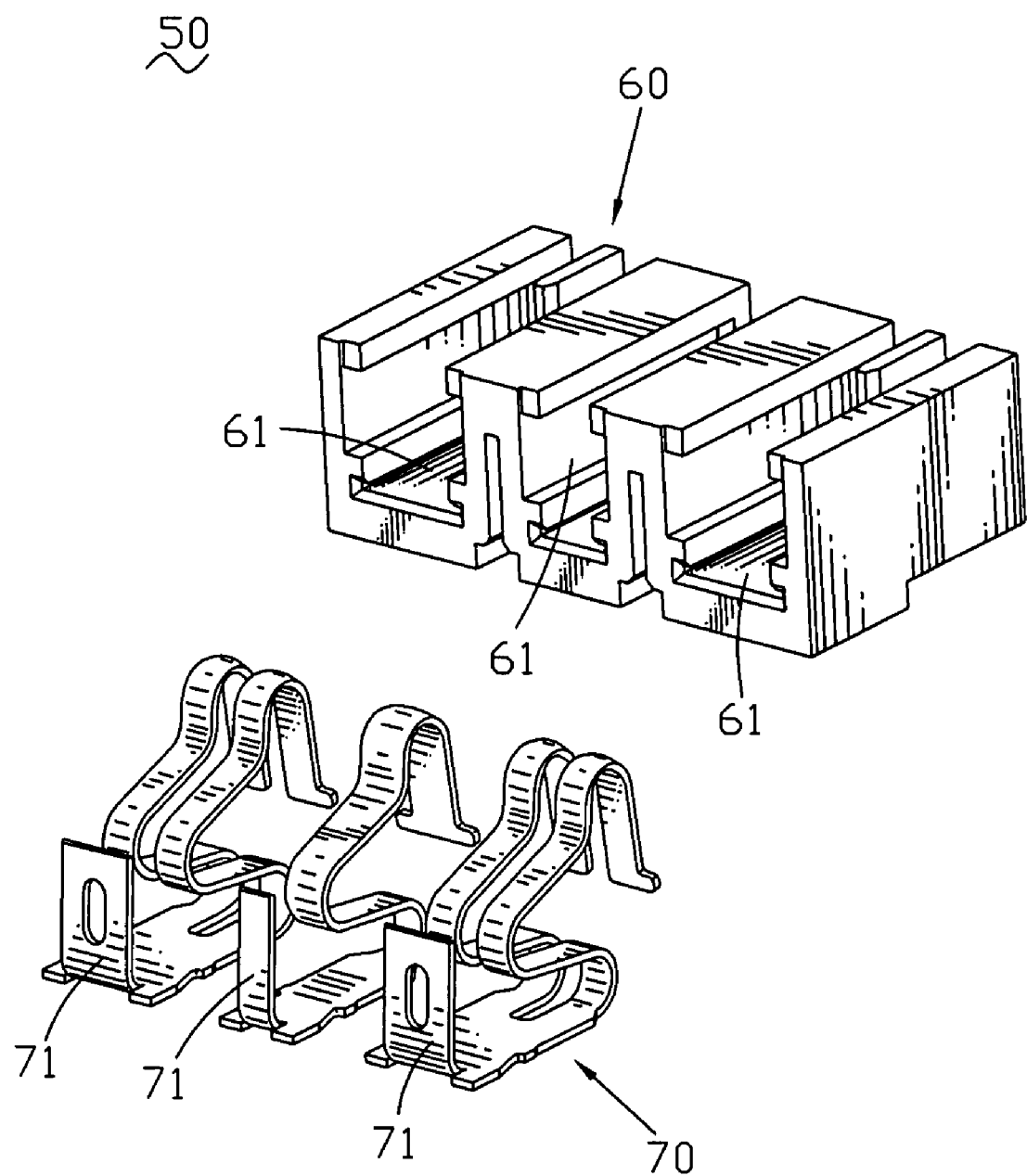
FIG. 4 is an exploded view of a traditional battery connector.

Referring back to FIGS. 2A, 2B and 3, the first electric terminal 2 is accepted in the first terminal groove 14, the second electric terminals 3 are accepted in the second terminal grooves 13. The first base 21 of the first electric terminal 2 is accepted in the fixed groove 16 of the first terminal groove 14, the second bases 31 of the second electric terminals 13 are accepted in the fixed grooves 16 of the second terminal grooves 13. The first agnail 25 of the base 21 is against the sidewalls of the fixed groove 16 of the first terminal groove 13 to fix the first electric terminal 2 in the first terminal groove 13 firmly. The second agnail 35 of the base 31 is against the sidewalls of the fixed grooves 16 of the second terminal grooves 13 to fix the second electric terminals 3 in the second terminal grooves 13 firmly. The first contact portion 22 of the first electric terminal 2 and the second contact portions 32 of the second electric terminals 3 partly project out of the terminal grooves 13, 14 for contacting a battery (not shown). The first project slices 221 of the first electric terminal 2 are against the sidewalls of the first terminal groove 14, the second project slices 321 of the second electric terminals 3 are against the sidewalls of the second terminal grooves 13. The first welded tail portion 24 and the second welded tail portions 34 are located in the front end of the first terminal groove 14 and the second terminal grooves 13 with a part exposed outside the front surface 11 respectively. The first project edges 241 of the first electric terminal 2 and the second project edges 341 of the second electric terminals 3 are located in the gaps 19 and against the front walls of the withstanding beams 18.

When the battery connector 100 is welded in the electric board 5, the ground springs 4 are fastened in the electric board 5 by the fixed pillar 43 inserting in the electric board 5. By this, the battery is inserted into or fetched out of the battery connector 100 for many times, the battery connector 100 does not loosen with the electric board 5. The electric board 5 pushes the first welded tail portion 24 and the second welded tail portions 34 rearward a little, which makes the electric terminal 2, 3 be received in the terminal grooves 13, 14 more firmly, and the welded tail portions 24, 34 become vertical to the bases 21, 31, and at the same plane with the front surface 11 of the dielectric housing 1 or exposed outside the front surface 11 a little and parallel to the front surface 11. Therefore, the welded tail portions 24, 34 contact the electric board 5 with maximum areas.

As the above description, when the first electric terminal 2 and the second electric terminals 3 are assembled into the first terminal groove 14 and the second terminal grooves 14, the project edges 241 of the first electric terminal 2 and the project edges 341 of the second electric terminals 3 are against the front surface 11 of the dielectric housing 1, so the welded tail portions 24, 34 can be welded with the electric board 5 with maximum areas.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A battery connector, located on an electric board, comprising:

a dielectric housing, having a front surface, a rear surface, an upper surface, and a lower surface, terminal grooves defined from the front surface to the rear surface and through the upper surface, the bottoms of the terminal grooves extending toward two sides thereof to form a fixing groove respectively, the tops of two sidewalls of each terminal groove extending inwardly respectively to form a pair of withstanding beams, the front end of the withstanding beam being cut off to form a gap, the front of the lower surface defines at least one receiving groove located between the two adjacent terminal grooves and penetrating through the front surface;

electric terminals, accepted in the terminal grooves of the dielectric housing, having a base accepted in the fixed groove of the dielectric housing, the rear end of the base bending upwardly to form a spring portion, a contact portion extending from one end of the spring portion and partly upward projecting out of the terminal grooves, the middle of the front end of the base bending upwardly to form a welded tail portion, the welded tail portion leaning inwardly, two project edges extending outwardly from two sides of the top of the welded tail portion; and at least one ground spring received in the receiving groove, the ground spring having a body with a U shape, the body including a bottom arm, a front arm and a rear arm extending upwardly from the front and the rear of the bottom arm respectively, a fixed pillar extending forwardly from the front arm of the body and being vertical with respect to the front arm, the fixed pillar being inserted in the electric board, a cam being formed at the rear arm of the body to interfere with the receiving groove for fixing the ground spring in the receiving groove;

wherein the welded tail portion is located in the front end of the terminal groove with a part exposed outside the front surface, and the project edges of the electric terminal are located in the gaps and against the front walls of the withstanding beams.

2. The battery connector as set forth in claim 1, wherein the welded tail portion leans inwardly 85 degrees to the base.

3. The battery connector as set forth in claim 1, wherein the electric terminals includes a first electric terminal and two second electric terminals, the first electric terminal is arranged between the second electric terminals, the second electric terminal includes said base, two sides of the rear end of said base bends upwardly to form two said spring portions apart from each other, said contact portion extends from the end of said spring portion, a project slice extends outwardly from the outside of the rear end of the second contact portion.

\* \* \* \* \*